US011163540B2

(12) United States Patent
Maron et al.

(10) Patent No.: US 11,163,540 B2
(45) Date of Patent: Nov. 2, 2021

(54) APPLICATION PROGRAM FOR EXTENSION AND DEPLOYMENT OF INTEGRATED AND EXPORTABLE CROSS PLATFORM DIGITAL TWIN MODEL

(71) Applicant: ANSYS, INC., Canonsburg, PA (US)

(72) Inventors: Adriano Kurz Maron, Pittsburgh, PA (US); Xiao Li, McDonald, PA (US); Sameer Kher, Mars, PA (US)

(73) Assignee: ANSYS, INC., Canonsburg, PA (US)

( * ) Notice: Subject to any disclaimer, the term of this patent is extended or adjusted under 35 U.S.C. 154(b) by 0 days.

(21) Appl. No.: 16/723,014

(22) Filed: Dec. 20, 2019

(65) Prior Publication Data

US 2021/0191694 A1 Jun. 24, 2021

(51) Int. Cl.
*G06F 9/445* (2018.01)
*G06F 8/35* (2018.01)
*G06F 8/60* (2018.01)

(52) U.S. Cl.
CPC . *G06F 8/35* (2013.01); *G06F 8/60* (2013.01)

(58) Field of Classification Search
CPC .. G06F 8/65; G06F 11/1433; G06F 2201/865; H04L 67/18; H04L 67/34
USPC .................................................. 717/168–178
See application file for complete search history.

(56) References Cited

U.S. PATENT DOCUMENTS

2020/0285464 A1* 9/2020 Brebner .................. G06F 8/311
2020/0310394 A1* 10/2020 Wouhaybi ............ G05B 19/042

* cited by examiner

*Primary Examiner* — Chuck O Kendall
(74) *Attorney, Agent, or Firm* — Womble Bond Dickinson (US) LLP

(57) ABSTRACT

A method and apparatus for extending, customizing and validating a simulation-based digital twin model is described. In an exemplary embodiment, the device transmits a model to a client, where the model is a simulation-based digital twin model. In addition, the device receives a customization to the model, the where the customization adds a functionality to the model. Furthermore, the device deploys the model in a model platform, where the model is used in a simulation with the model platform and the model is coupled with the model platform.

20 Claims, 7 Drawing Sheets

APPLICATION PROGRAM FOR EXTENSION AND DEPLOYMENT OF INTEGRATED AND EXPORTABLE CROSS PLATFORM DIGITAL TWIN MODEL

FIELD OF INVENTION

This invention relates generally to model processing and more particularly to extending and deploying an integrated and exportable cross platform digital twin model.

BACKGROUND OF THE INVENTION

Applications that leverage the features of Internet of Things (IoT) usually require a combination of models that describe the physical behavior of real equipment, data analytics and integration modules in order to have not only a digital representation of a physical asset (simulation model), but also additional operation insights and integration with more extensive workflows. IoT platforms currently provide means to integrate and orchestrate all these individual execution modules. However, due to the lack of industry standards, each platform offers its own customized approach to achieve such task, transforming the development, deployment and maintenance into a very time-consuming platform-specific task.

SUMMARY OF THE DESCRIPTION

A method and apparatus of a device for extending, customizing, tuning and validating a Simulation-Based Digital Twin (SBDT) model is described. In an exemplary embodiment, the device transmits the SBDT model to a client, where the SBDT model corresponds to a digital model of a physical asset. In addition, the device receives a customization for such model, extending its functionalities via general-purpose programming languages. Furthermore, the device deploys the model in a pre-configured IoT platform environment, where the model is used in a simulation on a production-like configuration that emulates the real deployment.

In another embodiment, a device customizes a twin model. In this embodiment, the device receives a twin model including a physical model of a physical system. The device further executes the twin model to simulate the physical system based on the physical model, wherein the twin model includes an analytics to generate a presentation of simulation results for the physical system. The device additionally receives, in response to the presentation of the simulation results, a customization to update the twin model including an updated analytics to revise the presentation of the simulation results. Furthermore, the device deploys the updated twin model in a model platform, the updated twin model to perform future simulations of the physical system for presentation via the updated analytics.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
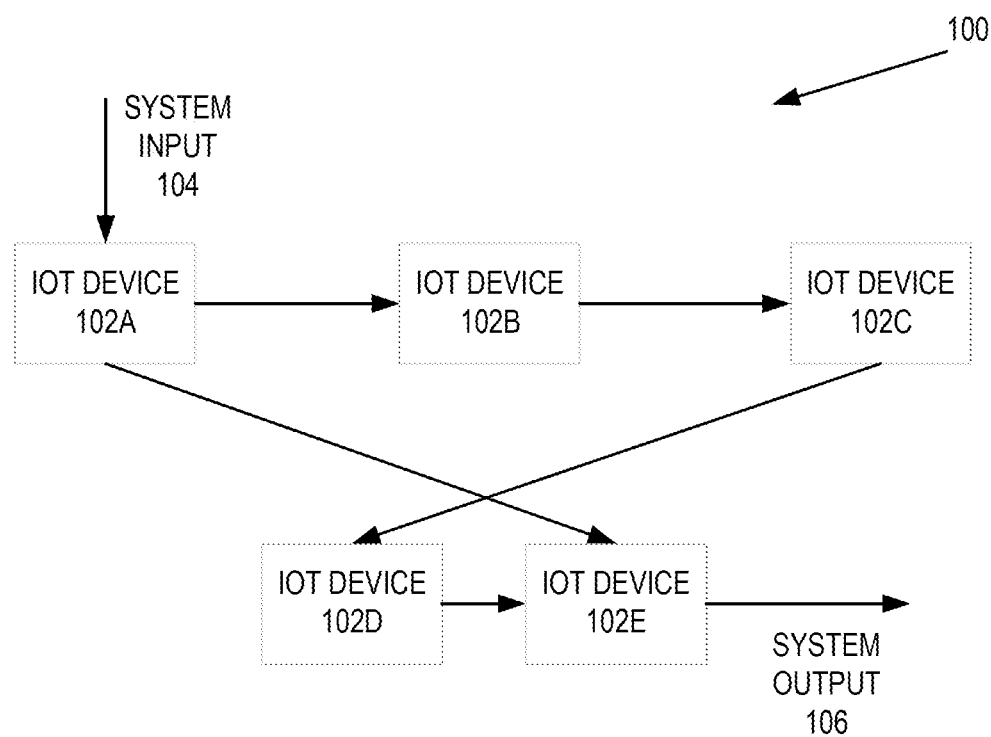
FIG. 1 is an illustration of one embodiment of a system that includes multiple Internet of Things (IoT) devices.

A method and apparatus of a device that customizes a model is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that customizes a model is described. In one embodiment, a web application with a graphical front-end allows users to input their commands and interact with the program to load models, run simulations, visualize results, and develop, test, and/or deploy their augmented (or customized) digital twin models. Processing tasks, such as simulation, model generation and deployment are managed by the remote back-end code. In one embodiment, the runtime environment, integrated into the back-end, provides the simulation capabilities for the program, including orchestration and data exchange between simulation models and custom modules created by users. The generation of augmented digital twin models is performed by features built-in on the back-end.

In one embodiment, applications that leverage the features of IoT usually require a combination of models that describe the physical behavior of real equipment, data analytics and integration modules in order to have not only a digital representation of a physical asset (simulation model), but also additional operation insights and integration with more extensive workflows. IoT platforms currently provide means to integrate and orchestrate all these individual execution modules. However, due to the lack of industry standards, each platform offers its own customized approach to achieve such task, transforming the development, deployment and maintenance into a very time-consuming platform-specific task.

In one embodiment, allowing users to integrate custom modules developed in popular programming languages (Python, C, C++, etc. . . . ) directly into the simulation-based digital twins, along with enabling direct data exchange without having to rely on external connections to remote servers and IoT platforms improves the performance and utility of the models. Such direct integration is suitable for applications that very frequently exchange data between the SBDT model and the additional modules. In these scenarios, IoT-based orchestration could suffer from an increased latency due to data transfer between different processing nodes. In one embodiment, latency is much smaller since the data is already in the local memory space of the runtime environment. Besides the reduced data transfer latency, development, maintenance and deployment tests can be done directly in the program, allowing that the final augmented model to behave as expected once it is deployed on the IoT cloud environment. Since the SBDT model and additional modules are already integrated, there is not needed to deploy and configure additional resources on any IoT platform.

FIG. 1 is an illustration of one embodiment of a system 100 that includes multiple Internet of Things (IoT) devices. In FIG. 1, system 100 include multiple IoT devices 102A-E coupled to a system input 104 and/or a system output 106. In one embodiment, the multiple IoT devices 102A-E are part of an IoT platform that is a system of interrelated computing devices, mechanical and/or digital machines, objects, and other devices that each have an identifier and can communicate data in the IoT platform without requiring human interaction. The IoT device 102A-E can be used to support a smart home, an industrial setting, data center, for environmental monitoring, and/or other types of applications (e.g., a water pump, air conditioner, power generator, lighting equipment, power supply, server or other type of computing device, networking device (e.g., switch, router, bridge, hub, and/or another type of device that can communicate data), uninterruptible power supply, power distribution unit, and/or any other type of device). While in one embodiment, there are five IoT devices 102A-E, in alternate embodiments, there can be more or less number of IoT devices (e.g., tens, hundreds, thousands, or more).

In one embodiment, each of the IoT devices 102A-E can have one or more inputs and/or outputs. In this embodiment, outputs of some of the IoT devices 102A-E can be coupled to the outputs of other IoT devices 102A-E (e.g., power outputted from one IoT device can be an input for one or more other IoT devices). For example and in one embodiment, IoT device 102A receives system input (e.g., a command, power, etc.), where the IoT device 102A sends its output to IoT devices 102B and 102E. In addition, the output of IoT device 102B is directed to the input of IoT device 102D. Furthermore, the output of IoT device 102D is directed to IoT device 102E, where the output of IoT device 102E is directed to a system output 106.

In one embodiment, each of the IoT devices 102A-E can represent the state and identity of a physical asset, a digital twin, or a combination of both, where information generated from both parties can be integrated into a single visualization entity.

In one embodiment, one or more of the models can be a Digital Twin. In this embodiment, the digital twin can be defined as "a digital model capable of rendering state and behavior of a unique real asset in (close to) real time." A further dissection of this definition points to the following five core characteristics. One characteristics is identity, which connects to a single, real and unique physical asset, such as a ship, a semisubmersible, a riser, a wind turbine, and/or another type of device. When a state is observed on the digital twin, it corresponds one-to-one with a potential observation on a particular physical asset. In an ideal world, a 1-to-1 cardinality between asset and twin would be preferable. However, pragmatic considerations may imply a 1-to-N cardinality, with several more-or-less well-connected twins, each covering a subset of relevant physics dimensions, IP scope, stakeholder perspectives, sub-systems or processes. Another characteristic is representation, which implies the capturing of essential physical manifestation of the real asset in a digital format, such as computer aided design (CAD) or engineering models with corresponding metadata. A further characteristic is state, which demarcates a digital twin from a traditional CAD/(computer aided engineering (CAE) model, by having the capability to render quantifiable measures of the asset's state in real time or close to real time. An additional characteristic is behavior that reflects basic responses to external stimuli (forces, temperatures, chemical processes, etc.) in the present context. Another characteristic is context, which describes external operating context, such as wind, waves, temperature, etc., in which the asset exists in or operates within.

In a further embodiment, using a digital twin makes it possible to do monitoring and inspection on the digital twin itself, thus saving (part of) the effort to do this by physically inspecting the real asset. This is of particular importance when access is a challenge, such as for instance offshore structures or subsea installations. It makes it possible to aggregate data at relatively high fidelity, such as stress cycle counting in fatigue life utilization calculations.

Examples of useful applications of a Digital Twin for a high value, high complexity asset include: remaining life assessment of structure; inspection/maintenance planning based on true load history; relationship between loads and power production for control system policies; early damage detection for pre-emptive maintenance and shutdown prevention; hindsight to foresight—access to (aggregated) time series for design feedback; virtual inspection support; predict consequences of (adverse) future operating conditions; multi-asset orchestration/control and synchronization; inspection/monitoring process support (cost reduction); and/or visualization and inspection of stresses at inaccessible/hidden locations.

Figure 2:
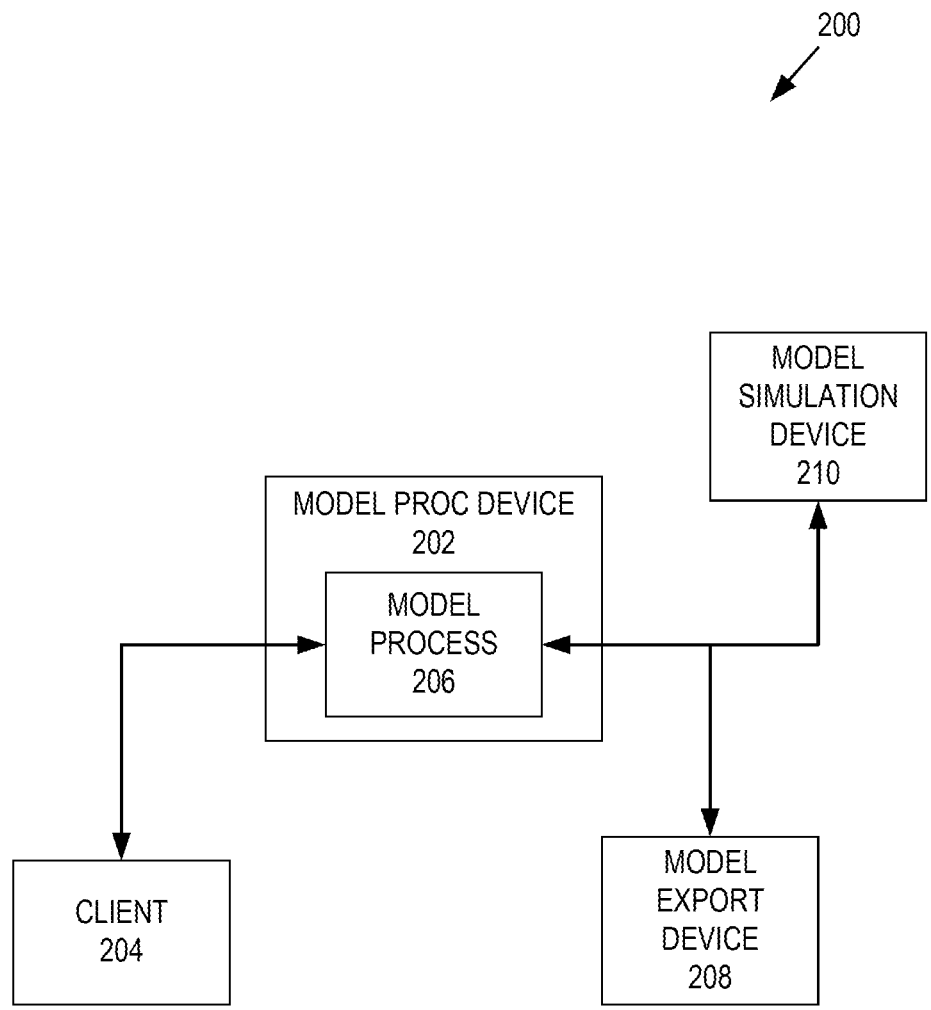
FIG. 2 is an illustration of one embodiment of a system that includes a model processing server that processes customized user models and export these customized models.

FIG. 2 is an illustration of one embodiment of a system 200 that includes a model processing server that processes customized user models and exports these customized models. In FIG. 2, the system 200 includes a client 204 that is coupled with a model processing device 202, where the model processing server 202 is coupled to a model export device 208 and a model simulation device 210. In this embodiment, each of the model processing device 202 and/or model export device 208 can be a personal computer, laptop, server, mobile device (e.g., smartphone, laptop, personal digital assistant, music playing device, gaming device, etc.), and/or any device capable processing data. Furthermore, and in one embodiment, the client 204 can be a personal computer, laptop, server, mobile device (e.g., smartphone, laptop, personal digital assistant, music playing device, gaming device, etc.), and/or any device capable sending, transmitting, and/or presenting data.

In one embodiment, the client 204 includes a web browser that is used to retrieve, view, and/or customize a model. In this embodiment, the web browser sends a request to the model processing device to retrieve a model. In one embodiment, the model can be in different formats, such as binary, executable, library and/or another type of file representation that a simulation can use to reproduce or predict behavior of an entity. In one embodiment, the client makes a Hypertext Transfer Protocol (HTTP) request (or some other type of request) to the model processing server to retrieve the information about a model. For example and in one embodiment, the model can be a SBDT model of an equipment that is used in an industrial application (e.g., a water pump, air conditioner, power generator, power supply, server or other type of computing device, networking device (e.g., switch, router, bridge, hub, and/or another type of device that can communicate data), uninterruptible power supply, power distribution unit, and/or any other type of device). Furthermore, through the web browser, a user may customize this model. In one embodiment, the user could modify an existing model by adding or changing model parameters. In a further embodiment, a user can add custom code to the model that can be used to sample, analyze, and or modify data that is received by, processed by, and/or output the model. In this embodiment, the user can interact with the web interface of device 204 and add custom analytics code (and/or other types of code) to give functionality to the model that may not be done during the creation of the SBDT. For example and in one embodiment, a user can add custom code that is Python, C, C++, and/or another type of programming language. In one embodiment, the client 204 receives the custom code and sends this custom code to the model processing device 202 for integration with the SBDT.

In one embodiment, the user can customize the data flows for the inputs and/or outputs using an application running on the client 204. In this embodiment, when a user selects the target IoT platform, the application will ask for the necessary information to access the IoT service (access key, server name, credentials, and/or other types of information). The simulation will then be configured based on the IoT service selected. For example and in one embodiment, for a client-driven simulation, this type of simulation does not need any external control and will be driven by events (e.g. new sensor data on a remote queue) generated by the IoT application. In these cases, the user needs to specify what is the data source and to what model inputs the data source maps to using the client 204. This information is then managed by a runtime to exchange information with the IoT environment (either periodically or based on events). In another example, for a server-driven simulation, the simulation is controlled by an external application from the IoT environment, which explicitly invokes runtime Application Programming Interfaces (APIs) to manage the simulation (set inputs, advance simulation, get outputs, and/or other types of actions). In a further embodiment, other simulation modes might also be possible.

In another embodiment, the model processing device 202 can program the model by setting up the data inputs and/or outputs, the types of custom code added, and the type of support needed for the custom code added to the model (e.g., what libraries, how compiled, executed, or interpreted, and/or processed) in a configuration for the model. In this embodiment, the configuration is saved within the augmented digital twin model.

In one embodiment, the model processing device 202 is a device that allows for one or more users to view, manage, customize, and/or manage one or more models. For example and in one embodiment, the model processing device 202 allows a user to associate custom code with a particular model. In this embodiment, this custom code can be used to sample, analyze, and or modify data that is received, processed, and/or output by the model. For example and in one embodiment, a user may wish to perform complex analytics on the type of data that is received by a model.

In one embodiment, up to two types of simulations can be performed using the customized model. In one embodiment, the model simulation device 210 can simulate the customized model by itself, where this type of simulation is concerned with validating the model without being integrated into an IoT platform. In this embodiment, this type of simulation relies of user-provided input data for the simulation (via an input file, such as a text file, .csv file, and/or some other type of input file), since this simulation does not include data streaming from other components of an IoT platform. With this type of simulation, a user can execute the model simulation and retrieve results, so as to view the results. For example and in one embodiment, a user can view the results, such as a 2-D plot, 3-D plot, custom visualizations, and/or other types of visualizations. In this example, the visualization can include (or not) data generated by the custom codes (e.g., input custom analytics, output custom analytics, and/or custom code). In one embodiment, this type of simulation is performed by the model process device (e.g., where a model process 206 can execute the simulation).

In another embodiment, the customized model can be validated as part of an IoT platform. In this embodiment, the customized model is integrated into an IoT platform selected by the user and a model simulation device 210 performs a model validation simulation using the appropriate IoT platform environment. Because an IoT platform can be quite complex (since this is intended to mimic a real-world IoT installation), it may be more efficient for a separate model simulation device to perform the model validation simulation for this IoT platform. In another embodiment, the customized model can include custom code that is used to add functionality to the model. In one embodiment, the customized model can be exported to the model export device 208 and saved for possible further customization and/or model deployment on a production environment.

Figure 3:
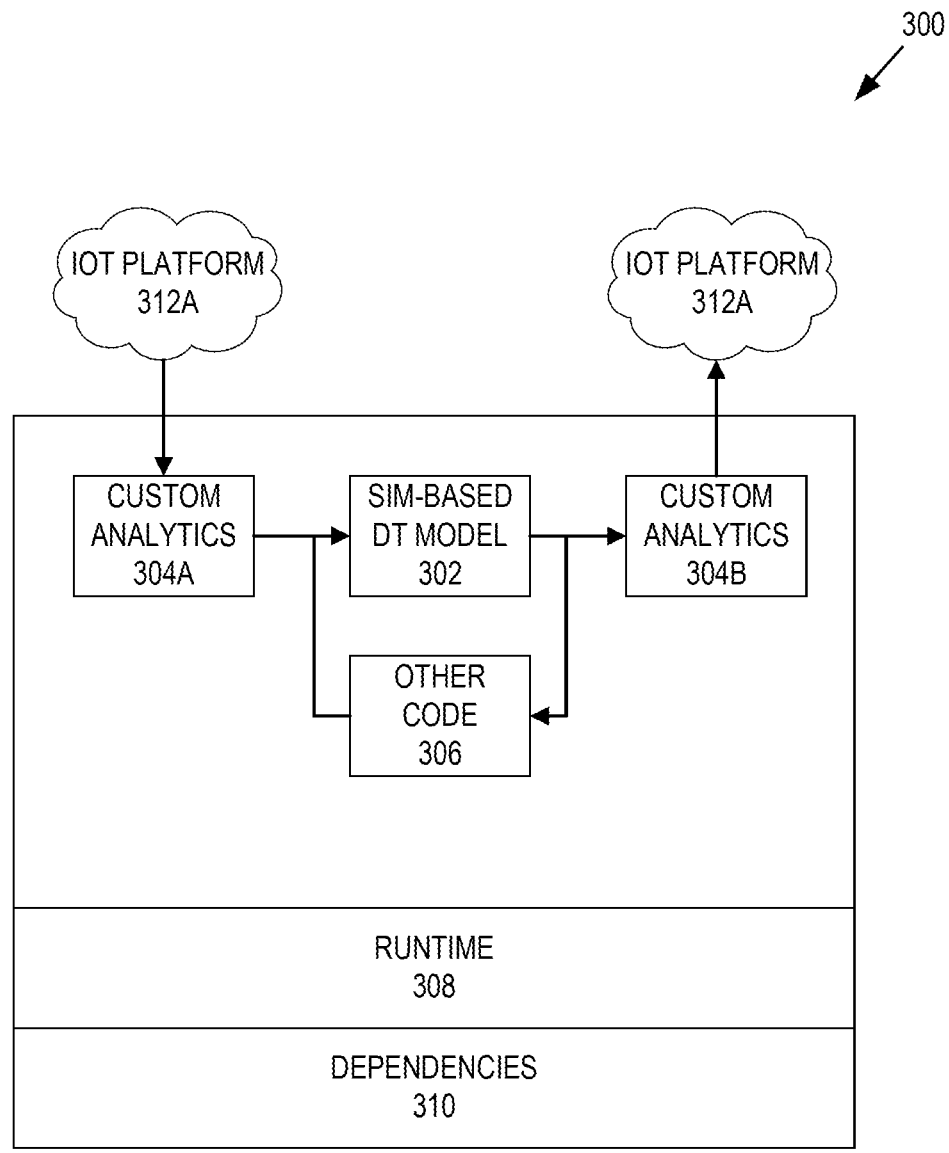
FIG. 3 is a block diagram of one embodiment of an augmented digital twin.

FIG. 3 is a block diagram of one embodiment of an augmented digital twin model 300. In FIG. 3, the augmented digital twin model 300 includes custom analytics 304A-B, simulation-based digital twin model 302, and other code 306. In this embodiment, the simulation-based digital twin model 302 is a digital simulation model of some equipment that is used in an industrial application. In another embodiment, the simulation-based digital twin model 302 is a digital twin of a device, where in the digital twin, the basic laws of physics and structural mechanics is embedded in the behavior of the twin. Thus, with a digital twin model, it is possible to assess the performance, such as stress level, accumulated fatigue, and/or other characteristics of the corresponding device, independently of experience data from the same or similar assets. Such performances can be resolved at any position on the structure. The flip side is that physics based twins are more complex to implement than a data analytics solution since it requires a relatively detailed structural model of the asset, combined with powerful analysis capability to solve the state of the model in real time based on sensor input. For example and in one embodiment, the simulation-based digital twin model 302 can be a model for a device, such as a water pump, power generator, server, or another type of device. In a further embodiment, the simulation-based digital twin model 302 could be a model for a set of two or more devices and/or processes. In one embodiment, the simulation-based digital twin model 302 can be used to determine information regarding the correspond device(s) and/or process(es), such as mean time between failure (MTBF), operation conditions, functionalities, system trouble spots, environmental conditions, predictive maintenance, what-if analysis, virtual sensors, and/or other types of information.

In one embodiment, the simulation-based digital twin model 302 can receive a stream of data from an IoT platform 312A and output a stream of data to IoT platform 312B. In one embodiment, each of the IoT platforms 312A-B is a collection of one or more models for one or more connected physical devices, processes, and/or systems. For example and in one embodiment, an IoT platform 312A-B can be defined as a web-based service that allows users to connect physical and virtual equipment together in a digital representation of a real installation facility and/or process. In this example, using an IoT platform 312A-B allows for the monitoring and operation of equipment in the IoT platform 312A-B based on sensor data received and exchanged between connected components of the IoT platform 312A-B. In addition, the augmented digital twin model 300 can include one of an input custom analytics 304A, output custom analytics 304B, and other code 306. In this embodiment, the input custom analytics 304A is code that preprocesses the data stream from the IoT platform 312A to the simulation-based digital twin model 302. For example and in one embodiment, the input custom analytics 304A could be used to sample data from the data stream being sent from the IoT platform 312A to the simulation-based digital twin model 302. In this example, sampling the data can be used to analyze the data stream from IoT platform 312A over time in non-real time (e.g., in a batch). In another example, the input custom analytics 304A could be used analyze the data stream from the IoT platform 312A in real-time. In a further example, the input custom analytics 304A could be used to modify the data stream from the IoT platform 312A. This example could be used to see how the simulation-based digital twin model 302 changes (and possibly other components downstream, such as the IoT platform 312B) as the data stream from the IoT platform 312A changes (e.g., scaling some or all of the data stream by a percentage, temporarily stopping/starting some or all of the data stream, input a new data flow, etc.). In one embodiment, each of the custom analytics 304A-B could also be some control system that performs particular actions on the simulation-based digital twin model 302 based on the inputs from the IoT Platform 312A. Similarly, outputs of the simulation-based digital twin model 302 could feed information to additional systems that may or may not interact directly with the simulation-based digital twin model 302 itself (e.g., could trigger actions on external systems directly or through data sent to the IoT Platform 312A). In a further embodiment, either of the custom analytics 304A-B can be code that can communicate to a third party via a communications network (not illustrated). In this embodiment, the custom analytics 304A-B can be used to control the third party, receive additional data directly from the third party and/or perform other types of the actions.

In one embodiment, the output custom analytics 304B is code that post-processes the data stream from the simulation-based digital twin model 302 to the IoT platform 312B. For example and in one embodiment, the input custom analytics 304B could be used to sample data from the data stream being sent from the simulation-based digital twin model 302 to the IoT platform 312A. In this example, sampling the data can be used to analyze the data stream being output by the physics over time in non-real time (e.g., in a batch). In another example, the output custom analytics 304B could be used analyze the data stream being output by the simulation-based digital twin model 302 in real-time. In a further example, the output custom analytics 304B could be used to modify the data stream output by the simulation-based digital twin model 302. This example could be used to see how the IoT platform 312A changes as the data stream from the simulation-based digital twin model 302 changes (e.g., scaling some or all of the data stream by a percentage, temporarily stopping/starting some or all of the data stream, input a new data flow, etc.).

In a further embodiment, the augmented digital twin model 300 can include other code 306. In one embodiment, the other code 306 is a set of code that can be used to sample, analyze, and/or modify intermediate data associated with the simulation-based digital twin model 302. In this embodiment, the other code receives data output by the simulation-based digital twin model 302, processes this data and input some or all of the processed data back into the simulation-based digital twin model. For example and in one embodiment, the other code 306 could be used to sample the intermediate data for later analysis, analyzed in real-time, and/or modified through various algorithmic solutions, such as (but not limited to) Machine Learning, control systems, and others.

In one embodiment, each of the input custom analytics 312A, output custom analytics 312B, and other code 306 can each independently be a set of programming code (e.g., python, C, C++, Java, and/or another type of programming code) that is used to program the functionalities of input custom analytics 312A, output custom analytics 312B, or other code 306. The set of programming code can be compiled and executed, interpreted code, and/or executed in some other fashion. In one embodiment, the input custom analytics 312A, output custom analytics 312B, other code 306 and simulation-based digital twin 302 are executed using the runtime 308, which is a runtime environment. In one embodiment, the runtime 308 is a collection of APIs that allows an external program to control the simulation of the simulation-based twin model 302 (set inputs, get outputs, advance simulation, and/or perform another type of action). The runtime 308 manages the data flow within the model, without any extra action from an external program (e.g., a client application does not need to know the internal topology of the augmented digital twin model).

In one embodiment, a process implements the functions of the APIs to control the simulation functions implemented by the API. For example and in one embodiment, an application is instantiated on the model simulation device that implements the functions of the APIs so that the runtime 308 can make calls to the APIs for the simulation-based digital twin model 302. In another embodiment, new data sets can be introduced to the simulation-based digital twin model 302 by subscribing to data from devices (e.g., different sensors) that publish this data.

In one embodiment, through the graphical interface of client 204, the user can specify the behavior and interfaces (e.g., inputs and/or outputs) of the custom modules, as well as the connections between them via manipulation of icons and wires. In this embodiment, the graphical representation of the model topology of the augmented digital twin model 300 gets automatically translated to a configuration file embedded in the simulation-based digital twin model 302 and later loaded, parsed, and understood by runtime 308. In one embodiment, the dependencies 310 are the underlying operating system, any IoT platform specific program, packages and/or libraries used by the runtime 308 and custom analytics 304A-B. In this embodiment, a user can use a Python program to develop custom analytics 304A. The packages and libraries used by the Python program would be specified by the user and later included in dependencies 310 by the model processing device 202.

Figure 4:
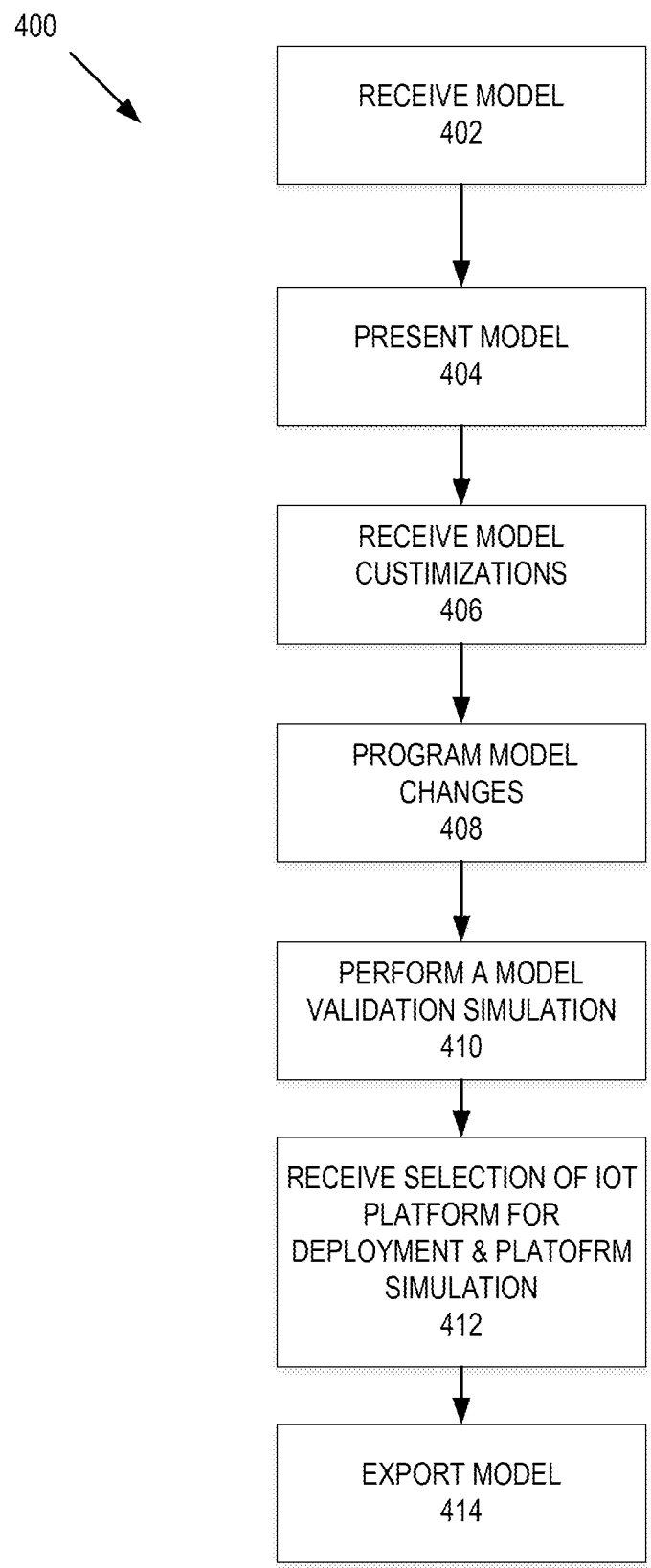
FIG. 4 is a flow diagram of one embodiment of a process to customize a model.

FIG. 4 is a flow diagram of one embodiment of a process 400 to process to customize a model. In one embodiment, process 400 is performed by another component to process the customized model, such as the model process 206 as described in FIG. 2 above. In FIG. 4, process 400 begins by receiving a request for the model at block 402. In one embodiment, the request can be an HTTP request from a client as described in FIG. 2 above. Process 400 transmits the model to the requesting client at block 404. In one embodiment, process 400 transmits the model using an HTTP response.

At block 406, process 400 receives model customizations. In one embodiment, the model customization can be modifications to model parameter's input via a web browser or other type of client as described in FIG. 2 above. In another embodiment, the model customizations are a set of programming code that is used to process input data to the model, output data from the model, and/or intermediate data of the model. For example and in one embodiment, the set of programming code can be used to program the input custom analytics, output custom analytics, and/or other code as described in FIG. 3 above. Process 400 programs the model changes at block 408. In one embodiment, process 400 programs that changes by creating a configuration for the model as described above.

At block 410, process 400 performs a simulation for model validation. In one embodiment, the simulation can be done interactively, where the results of the simulation are presented to the user via the client and the user can interactively change the model (e.g., change the model parameters, add or modify custom code, and/or other types of changes to the model customization). Performing a model validation simulation is further described in FIG. 5 below. At block 412, process 400 receives a selection of an IoT platform for deployment and simulation within that IoT platform. In one embodiment, a user will indicate which IoT platform to deploy the customized model. In this embodiment, the customized model is loaded into the corresponding environment for that IoT platform and a simulation is performed with this IoT platform. Deployment and platform simulation is further descried in FIG. 6 below. Process 400 exports the customized model at block 414. In one embodiment, process 400 sends the customized model to a model export device as described in FIG. 2 above. In this embodiment, the exported customized model is saved for possible further customization and/or model deployment on a production environment.

Figure 5:
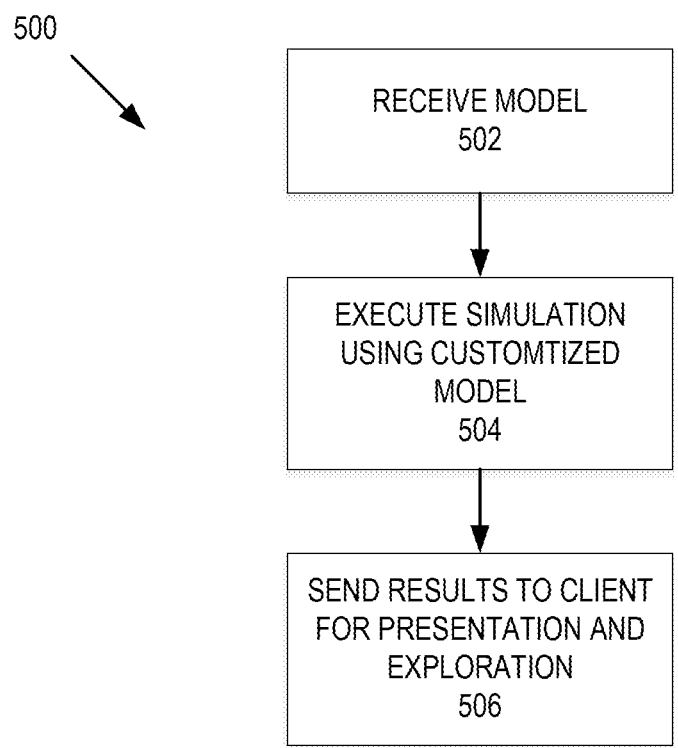
FIG. 5 is a flow diagram of one embodiment of a process to perform a model validation simulation.

FIG. 5 is a flow diagram of one embodiment of a process 500 to perform a model validation simulation. In one embodiment, a process uses process 500 to simulate a model, such as process 400 at block 410 above. In FIG. 5, process 500 begins by receiving the model at block 502. In one embodiment, the model is a customized model that can include one or more of an input custom analytics, output custom analytics, and/or other code as described above in FIG. 3. Process 500 performs a model validation simulation using the customized model at bock 504. In one embodiment, a model validation simulation is a simulation runs on a standardized environment that is not related to any IoT platform. In this embodiment, the intent is to validate the model behavior in a simplified environment with a predefined input profile. For example and in one embodiment, the data input can be test data that is stored in an input file. In another embodiment, the model validation can be performed in on the IoT environment. In this embodiment, this model validation simulation runs on an environment (containerized) very similar to the desired IoT platform (in terms of packages, libraries, OSs, and/or other components), where simulation input/output might be received/sent as data streams from/to the desired IoT platform. At block 506, process 500 sends the results of the model validation simulation back to the client, where the user can view the results of the simulation. In one embodiment, the use can view the results using 2-D plots, 3-D plots, custom visualization output from the custom code, and/or other types of visualizations. In this embodiment, the user can interact with the visualizations (e.g., zooming, palming, and/or other types of interactions) to explore the simulation results.

Figure 6:
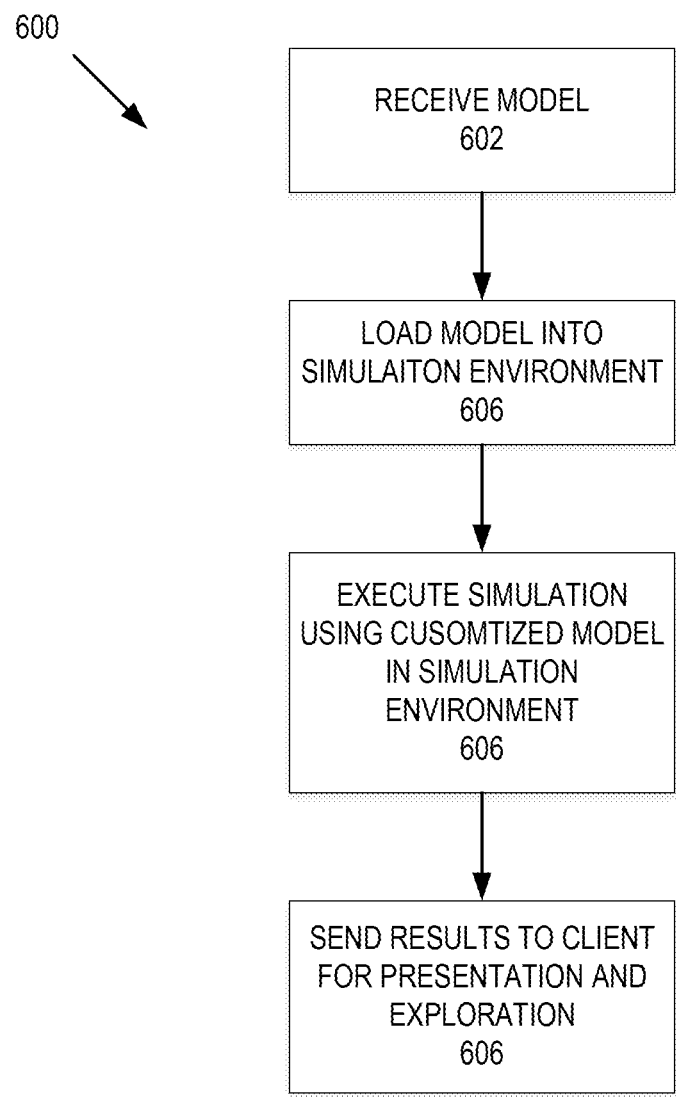
FIG. 6 is a flow diagram of one embodiment of a process to simulate a model within an IoT platform.

FIG. 6 is a flow diagram of one embodiment of a process to simulate a model within an IoT platform. In one embodiment, a model simulation device 210 uses process 600 to simulate a model with an IoT platform, such as model simulation device 210 as described in FIG. 2 above. In FIG. 6, process 600 begins by receiving the model at block 602. In addition, process 600 receives an identification of the selected IoT platform. In one embodiment, the model is a customized model that can include one or more of an input custom analytics, output custom analytics, and/or other code as described above in FIG. 3. Process 600 loads the model into the simulation environment at bock 606. In one embodiment, process 600 loads the model into the simulation environment, where the simulation environment includes a runtime environment and dependencies to generate a runtime model as described above.

At block 608, process 600 executes the simulation using the customized model in the simulation environment. In one embodiment, process 600 executes the simulation by instantiating the IoT platform, loading the customizing model, connecting the inputs and outputs of the customized model with other components of the IoT platform, and executing the components of the IoT platform (including the customized model). In this embodiment, executing the components of the IoT platform can include executing the input custom analytics, output custom analytics, and/or other code (as described in FIG. 2 above). Process 600 sends the results of the simulation back to the client, where the user can view the results of the simulation. In one embodiment, the use can view the results using 2-D plots, 3-D plots, custom visualization output from the custom code, and/or other types of visualizations. In this embodiment, the user can interact with the visualizations (e.g., zooming, panning, and/or other types of interactions) to explore the simulation results.

Figure 7:
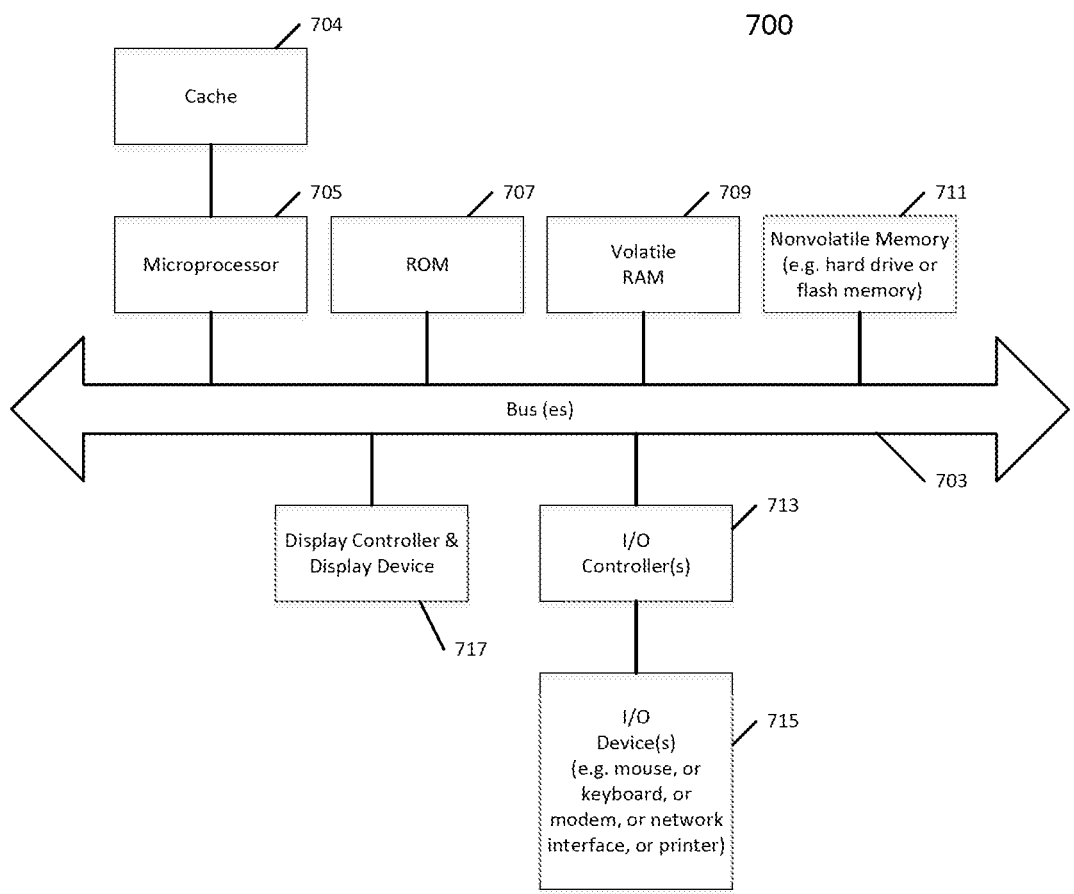
FIG. 7 illustrates one example of a typical computer system, which may be used in conjunction with the embodiments described herein.

FIG. 7 shows one example of a data processing system 700, which may be used with one embodiment of the present invention. For example, the system 700 may be implemented as a system that includes a model processing device 202 as shown in FIG. 2 above. Note that while FIG. 7 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 7, the computer system 700, which is a form of a data processing system, includes a bus 703 which is coupled to a microprocessor(s) 705 and a ROM (Read Only Memory) 707 and volatile RAM 709 and a non-volatile memory 711. The microprocessor 705 may include one or more CPU(s), GPU(s), a specialized processor, and/or a combination thereof. The microprocessor 705 may retrieve the instructions from the memories 707, 709, 711 and execute the instructions to perform operations described above. The bus 703 interconnects these various components together and also interconnects these components 705, 707, 709, and 711 to a display controller and display device 717 and to peripheral devices such as input/output (I/O) devices which may be mice, keyboards, modems, network interfaces, printers and other devices which are well known in the art. Typically, the input/output devices 715 are coupled to the system through input/output controllers 77. The volatile RAM (Random Access Memory) 707 is typically implemented as dynamic RAM (DRAM), which requires power continually in order to refresh or maintain the data in the memory.

The mass storage 711 is typically a magnetic hard drive or a magnetic optical drive or an optical drive or a DVD RAM or a flash memory or other types of memory systems, which maintain data (e.g. large amounts of data) even after power is removed from the system. Typically, the mass storage 711 will also be a random access memory although this is not required. While FIG. 7 shows that the mass storage 711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "transmitting," "deploying," "simulating," "forwarding," "retrieving," "checking," "allowing," "rejecting," "generating," "confirming," "constructing," "comparing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method comprising:
   transmitting a model to a client, wherein the model is a simulation-based digital twin model and the model is presented on the client via a user interface;
   receiving a customization to the model from the client, wherein the customization adds a functionality to the model, the customization includes programming code that adds the functionality, and the customization is entered via the user interface; and
   deploying the model in a model platform, wherein the model is used in a simulation with the model platform and the model is coupled with the model platform.

2. The non-transitory machine-readable medium of claim 1, wherein the model is presented to a user via client.

3. The non-transitory machine-readable medium of claim 1, wherein the model receives input data from the model platform and the customization can process this input data.

4. The non-transitory machine-readable medium of claim 1, wherein the model receives output data from the model platform and the customization can process this output data.

5. The non-transitory machine-readable medium of claim 1, wherein the model generates intermediate data and the customization can process this intermediate data.

6. The non-transitory machine-readable medium of claim 1, wherein the functionality is at least one of sampling data, analyzing data, and modifying data.

7. The non-transitory machine-readable medium of claim 1, wherein the customization can be one of executing an executable file and interpreting a script.

8. The non-transitory machine-readable medium of claim 1, wherein the model represents a device.

9. A non-transitory machine-readable medium having executable instructions to cause one or more processing units to perform a method comprising:
   receiving a twin model including a physical model of a physical system;
   executing the twin model to simulate the physical system based on the physical model, wherein the twin model includes an analytics to generate a presentation of simulation results for the physical system;
   receiving, from a client and in response to the presentation of the simulation results, a customization to update the twin model including an updated analytics to revise the presentation of the simulation results, the customization includes programming code that adds the updated analytics, and the customization is entered via a user interface on the client; and
   deploying the updated twin model in a model platform, the updated twin model to perform future simulations of the physical system for presentation via the updated analytics.

10. The non-transitory machine-readable medium of claim 9, wherein a twin model a model capable of rendering state and behavior of a unique real asset in close to real time.

11. A method comprising:
    transmitting a model to a client, wherein the model is a simulation-based digital twin model and the model is presented on the client via a user interface;
    receiving a customization to the model from the client, the wherein the customization adds a functionality to the model, the customization includes programming code that adds the functionality, and the customization is entered via the user interface; and
    deploying the model in a model platform, wherein the model is used in a simulation with the model platform and the model is coupled with the model platform.

12. The method of claim 11, wherein the model is presented to a user via client.

13. The method of claim 11, wherein the model receives input data from the model platform and the customization can process this input data.

14. The method of claim 11, wherein the model receives output data from the model platform and the customization can process this output data.

15. The method of claim 11, wherein the model generates intermediate data and the customization can process this intermediate data.

16. The method of claim 11, wherein the functionality is at least one of sampling data, analyzing data, and modifying data.

17. The method of claim 11, wherein the customization can be one of executing an executable file and interpreting a script.

18. The method of claim 11, wherein the model represents a device.

19. A method comprising:
    receiving a twin model including a physical model of a physical system;
    executing the twin model to simulate the physical system based on the physical model, wherein the twin model includes an analytics to generate a presentation of simulation results for the physical system;
    receiving, from a client and in response to the presentation of the simulation results, a customization to update the twin model including an updated analytics to revise the presentation of the simulation results, the customization includes programming code that adds the updated analytics, and the customization is entered via a user interface on the client; and
    deploying the updated twin model in a model platform, the updated twin model to perform future simulations of the physical system for presentation via the updated analytics.

20. The method of claim 19, wherein a twin model a model capable of rendering state and behavior of a unique real asset in close to real time.

* * * * *